United States Patent
Dhillon et al.

(10) Patent No.: US 11,232,710 B2
(45) Date of Patent: Jan. 25, 2022

(54) DRIVER FEEDBACK FOR EFFICIENTLY TRAVERSING INTERSECTIONS

(71) Applicant: GOOGLE LLC, Mountain View, CA (US)

(72) Inventors: Neil Dhillon, Mountain View, CA (US); Tanmay Wadhwa, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 80 days.

(21) Appl. No.: 16/481,132

(22) PCT Filed: Mar. 7, 2018

(86) PCT No.: PCT/US2018/021263
§ 371 (c)(1),
(2) Date: Jul. 26, 2019

(87) PCT Pub. No.: WO2019/172897
PCT Pub. Date: Sep. 12, 2019

(65) Prior Publication Data
US 2021/0049907 A1 Feb. 18, 2021

(51) Int. Cl.
*G08G 1/01* (2006.01)
*G01C 21/34* (2006.01)
(Continued)

(52) U.S. Cl.
CPC ... *G08G 1/096783* (2013.01); *G01C 21/3492* (2013.01); *G08G 1/0969* (2013.01); *G08G 1/096816* (2013.01); *H04W 4/44* (2018.02)

(58) Field of Classification Search
CPC .............. G08G 1/01; G08G 1/096783; G08G 1/096816; G08G 1/0969; G01C 21/34; G01C 21/3492; H04W 4/44
See application file for complete search history.

(56) References Cited

U.S. PATENT DOCUMENTS 8,972,076 B2 * 3/2015 Ogawa ............. G08G 1/096725
701/1
10,217,357 B1 * 2/2019 Elsheemy .......... G08G 1/09623
(Continued)

OTHER PUBLICATIONS

International Search Report and Written Opinion for Application No. PCT/US2018/021263, dated Dec. 4, 2018, 14 pages.
(Continued)

*Primary Examiner* — Tan Q Nguyen
(74) *Attorney, Agent, or Firm* — Marshall, Gerstein & Borun LLP

(57) ABSTRACT

In a method for efficiently guiding a driver of a vehicle through intersections, information regarding status of one or more traffic lights positioned at one or more intersections is received by a computing device or system associated with the driver or vehicle, and a current speed of the vehicle is monitored as the vehicle approaches the intersection(s). A dynamic visual or audio indicator is set based on the status information and the current speed, and presented to the driver via a display or speaker, respectively, of the computing device or system. The dynamic indicator is indicative of one or more changes in speed that, if matched by the driver as the vehicle approaches the one or more intersections, would cause the driver to avoid one or more stops as the vehicle moves through the one or more intersections.

20 Claims, 6 Drawing Sheets

(51) Int. Cl.
*G08G 1/0967* (2006.01)
*H04W 4/44* (2018.01)
*G08G 1/0968* (2006.01)
*G08G 1/0969* (2006.01)

(56) References Cited

U.S. PATENT DOCUMENTS

| | | | | |
|---|---|---|---|---|
| 2010/0004839 A1* | 1/2010 | Yokoyama | ............. | G08G 1/052 701/70 |
| 2010/0007523 A1* | 1/2010 | Hatav | ................... | G08G 1/166 340/901 |
| 2010/0106413 A1* | 4/2010 | Mudalige | ............. | B60W 50/14 701/469 |
| 2011/0098916 A1* | 4/2011 | Jang | ................... | G01C 21/3697 701/533 |
| 2012/0169517 A1* | 7/2012 | Cho | ....................... | G08G 1/164 340/932 |
| 2015/0046038 A1* | 2/2015 | Kawamata | ............ | B60W 50/14 701/41 |
| 2016/0258777 A1 | 9/2016 | Bodake | | |
| 2016/0328975 A1* | 11/2016 | Tokita | ............. | B60W 30/18154 |
| 2017/0066374 A1* | 3/2017 | Hoye | .................... | B60W 30/08 |
| 2017/0122764 A1 | 5/2017 | Nakahara et al. | | |
| 2017/0229014 A1 | 8/2017 | Bradai et al. | | |
| 2017/0243481 A1* | 8/2017 | Neubecker | ....... | G08G 1/096783 |

OTHER PUBLICATIONS

Xu et al., "V2I Based Cooperation Between Traffic Signal and Approach Automated Vehicles", Jun. 2017, 12 pages, <https://www.researchgate.net/publication/318802000_V2I_based_cooperation_between_traffic_signal_and_approaching_automated_vehicles> (downloaded from the internet on Sep. 1, 2021).

"CAVI: In-vehicle Speed Warning (V2I)", YouTube, Aug. 9, 2017, 3 pages, https://www.youtube.com/watch?v=kMq6w3Fj6U0 (downloaded from the internet on Sep. 1, 2021).

"Audi V2I Tech: Traffic Lights That Talk to Your Car", Kelley Blue Book, 4 pages, <https://www.kbb.com/car-news/all-the-latest/audi-v2i-tech-traffic-lights-that-talk-to-your-car/2100001542/> (downloaded from the interneton Sep. 1, 2021).

Jake Lingeman, "Your 2017 Audi Will Countdown Traffic Lights for You", Autoweek, Aug. 16, 2016, 5 pages, <https://www.autoweek.com/news/a1852161/audi-will-countdown-traffic-lights-you-2017/> (downloaded from the internet on Sep. 1, 2021).

"First Toyota Cars to Include V2V and V2I Communication by the End of 2015", Posted Sep. 30, 2015, 3 pages, <http://sites.ieee.org/connected-vehicles/2015/09/30/first-toyota-cars-to-include-v2v-and-v2i-communication-by-the-end-of-2015/> (downloaded from the internet on Sep. 1, 2021).

"Toyota Bringing Advanced ITS Technology to Mass-market Models", Integrated Safety, Sep. 30, 2015, 5 pages, <https://newsroom.toyota.co.jp/en/detail/9676551/> (downloaded from the internet on Sep. 1, 2021).

"V2I Advisory Speed Limit Systems That Smooth Traffic Flow on Urban Arterials Can Improve Fuel Economy by Eight Percent and Reduce NOx Emissions by Nine Percent", Posted Jun. 27, 2017,6 pages,<https://www.itskrs.its.dot.gov/its/benecost.nsf/ID/94e2a76270d7649085258147005f1ae1> (downloaded from the internet on Sep. 1, 2021).

Mustafa Al-Mashhadani, "Enhancing Traffic Flow Using Vehicle Dashboard Traffic Lights With V2I Networks", University of New Mexico, UNM Digital Repository, Electrical and Computer Engineering ETDs, Sep. 1, 2015, 44 pages, <http://digitalrepository.unm.edu/cgi/viewcontent.cgi?article=1 011 &context=ece_etds> (downloaded from the internet on Sep. 1, 2021).

"Radar Driver Feedback Signs, LED Traffic Signs, Calming Devices", Trafficalm Systems, 7 pages, <http://trafficalm.com/> (downloaded from the interneton Sep. 1, 2021).

"ECO Assist System", 1 page,<http://owners.honda.com/utility/download?path=/static/pdfs/2013/Civic%20Hybrid/13_Civic Hybrid Navi__Eco Assist.pdf> (downloaded from the interneton Sep. 1, 2021).

* cited by examiner

DRIVER FEEDBACK FOR EFFICIENTLY TRAVERSING INTERSECTIONS

FIELD OF TECHNOLOGY

The present invention relates to driver electronic feedback and, more particularly, to systems and methods for providing a driver of a vehicle with speed-related feedback to facilitate the efficient traversal of intersections equipped with traffic lights.

BACKGROUND

The background description provided herein is for the purpose of generally presenting the context of the disclosure. Work of the presently named inventor(s), to the extent it is described in this background section, as well as aspects of the description that may not otherwise qualify as prior art at the time of filing, are neither expressly nor impliedly admitted as prior art against the present disclosure.

Drivers of automobiles and other vehicles often need to traverse multiple intersections before arriving at a desired destination, with some or all of those intersections being equipped with traffic lights to regulate traffic and avoid collisions. While thoughtful design typically underlies the timing of the traffic light status (e.g., green, yellow or red), based on characteristics of vehicular (and possibly pedestrian, etc.) traffic at each intersection, that timing may appear to be random from the perspective of a given driver on a given trip, making it difficult or impossible for the driver to avoid stopping at traffic lights a fair amount of the time. Thus, drivers commonly repeat a pattern of accelerating (e.g., after an initial traffic light turns green), and then slowing down and coming to a complete stop (e.g., when approaching a subsequent traffic light that is red or yellow). This results in various inefficiencies stemming from decreased fuel efficiency, increased vehicle emissions, and increased wear on vehicle components such as brakes.

As autonomous (self-driving) vehicles become more common, it is expected that roads will be shared by both autonomous and manually-driven vehicles. During this time, intersections will likely still have color-based (e.g., green/yellow/red) traffic signals, and traffic rules, that are very similar to those existing today. As traffic management in cities becomes "smarter," however, it is expected that autonomous vehicles will communicate with traffic infrastructure via Vehicle-to-Infrastructure (V2I) communication protocols, which would allow those vehicles to adjust speed so as to avoid, or reduce the frequency of, stopping at traffic lights. As a result, autonomous vehicles may optimize routes, reduce component wear, and increase fuel efficiency. Human drivers (and their vehicles), on the other hand, would continue to lack these benefits.

SUMMARY

In some implementations described herein, a computing device or system provides communication, processing, and display (and/or audio) capabilities to efficiently guide a human driver through one or more intersections along the driver's route. The computing device or system may receive information indicative of a status of an upcoming traffic light, and monitor one or more parameters such as the current speed of the vehicle and/or the current distance between the vehicle and the traffic light. The traffic light status information may be received from the traffic light itself (or some other infrastructure component) via a Vehicle-to-Infrastructure (V2I) communication link, for example. Using the light status information and the monitored parameter(s), the computing device or system may determine both (1) a speed that, if followed by the driver, would allow the driver to (legally) avoid stopping as the vehicle moves through the intersection, and (2) a difference between that speed and the vehicle's current speed. The determined speed may be a cruising speed that, if followed by the driver/vehicle, would cause the vehicle to arrive at the intersection while the light is green, for example. The computing device or system may also cause a display to present a visual, dynamic indicator reflecting the determined difference in real-time, and/or cause a speaker to generate an audio, dynamic indicator reflecting the determined difference in real-time. A human driver adhering to the "suggestions" of the dynamic indicator may operate his or her vehicle more efficiently (e.g., in terms of fuel efficiency and/or wear on vehicle components).

In one example implementation, a method for efficiently guiding a driver of a vehicle through one or more intersections includes receiving, by a computing device or system associated with the driver or the vehicle, information regarding status of one or more traffic lights positioned at the one or more intersections, and monitoring, by the computing device or system, a current speed of the vehicle over time as the vehicle approaches the one or more intersections. The method also includes causing, by the computing device or system, a dynamic visual or audio indicator to be presented to the driver via a display or speaker, respectively, of the computing device or system. The dynamic indicator is indicative of one or more changes in speed that, if matched by the driver as the vehicle approaches the one or more intersections, would cause the driver to avoid one or more stops as the vehicle moves through the one or more intersections, and wherein causing the dynamic indicator to be presented to the driver includes setting the dynamic indicator based on (i) the information regarding status of the one or more traffic lights and (ii) the current speed.

In another example implementation, a computing device or system associated with a vehicle or a driver of the vehicle includes a display or a speaker, a communication interface, one or more processors, and a memory storing instructions that, when executed by the one or more processors, cause the computing device or system to receive, via the communication interface, information regarding status of one or more traffic lights positioned at one or more intersections, monitor a current speed of the vehicle over time as the vehicle approaches the one or more intersections, and cause a dynamic visual or audio indicator to be presented to the driver via the display or the speaker, respectively, of the computing device or system. The dynamic indicator is indicative of one or more changes in speed that, if matched by the driver as the vehicle approaches the one or more intersections, would cause the driver to avoid one or more stops as the vehicle moves through the one or more intersections. Causing the dynamic indicator to be presented to the driver includes setting the dynamic indicator based on (i) the information regarding status of the one or more traffic lights and (ii) the current speed.

DETAILED DESCRIPTION OF THE DRAWINGS

Overview

In some implementations described herein, a computing device or system (e.g., a computing system integrated in a vehicle, and/or a smartphone or other personal mobile device) provides communication, processing, and display (and/or audio) capabilities to efficiently guide a human driver through one or more intersections along the driver's route. The computing device or system may receive information indicative of a status of an upcoming traffic light (e.g., the amount of time before the light turns green or turns red), and monitor parameters such as the current speed of the vehicle and/or the current distance between the vehicle and the traffic light.

The traffic light status information may be received from the traffic light itself (or some other infrastructure component) via a Vehicle-to-Infrastructure (V2I) communication link, for example. Speed may be monitored in various ways, such as receiving speed data from a vehicle subsystem, measuring speed via an inertial measurement unit (IMU) or satellite positioning unit (e.g., GPS), and so on. Distance may also be monitored in various ways, such as using traffic light position information received via a V2I link in conjunction, as well as the vehicle's current location (e.g., based on GPS data), for example.

Using the light status information and the monitored parameters, the computing device or system may determine both (1) a speed that, if followed by the driver, would allow the driver to (legally) avoid stopping as the vehicle moves through the intersection, and (2) a difference between that speed and the vehicle's current speed. The determined speed may be a cruising speed that, if followed by the driver/vehicle, would cause the vehicle to arrive at the intersection while the light is green, for example. The computing device or system may also include, or be coupled to, a display, and cause the display to present a visual, dynamic indicator reflecting the determined difference (e.g., as a color, shading, brightness, text, etc., indicating that the driver should accelerate or decelerate) in real-time. Alternatively, or in addition, the computing device or system may include, or be coupled to, a speaker, and cause the speaker to generate an audio, dynamic indicator reflecting the determined difference (e.g., a "reduce speed to avoid red light" message) in real-time. A human driver adhering to the "suggestions" of the dynamic indicator may operate his or her vehicle more efficiently (e.g., in terms of fuel efficiency and/or wear on vehicle components).

Example Systems

Figure 1:
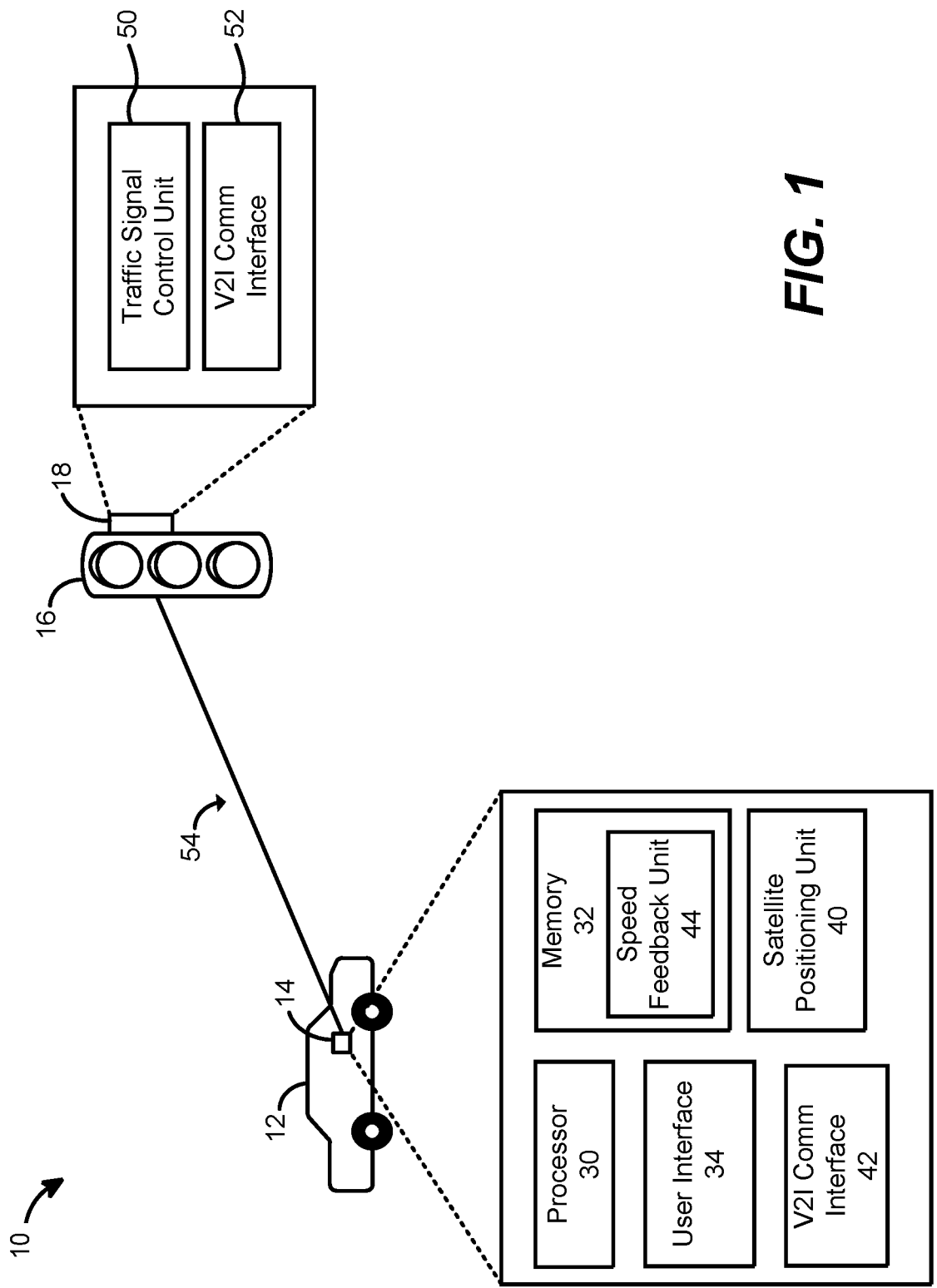
FIG. 1 is a block diagram of an example system for efficiently traversing intersections using driver feedback, according to some implementations.

FIG. 1 illustrates an example system 10 for efficiently traversing intersections using driver feedback, according to some implementations. As seen in FIG. 1, the example system 10 includes a vehicle 12 carrying a computing device or system 14, and a traffic light 16 having a processing component 18.

The computing device or system 14 may include one or more components integrated within the vehicle 12, and/or a portable device that is carried within an interior (e.g., passenger cabin) of the vehicle 12. For example, the computing device or system 14 may be an onboard computer of the vehicle 12, and/or may include a mobile computing device (e.g., smartphone, smart wearable device, tablet, etc.) of a driver or passenger of the vehicle 12.

In the example implementation of FIG. 1, the computing device or system 14 includes a processor 30, a memory 32, a user interface 34, a satellite positioning unit 40, and a Vehicle-to-Infrastructure (V2I) communication interface 42. The processor 30 may be a single processor (e.g., a central processing unit (CPU)), or may include a set of processors (e.g., multiple CPUs, or a CPU and a graphics processing unit (GPU), etc.). The memory 32 is a computer-readable storage unit or device, or collection of units/devices, that may include persistent (e.g., hard disk and/or solid state) and/or non-persistent memory components. The memory 32 generally stores instructions that are executable on the processor 30 to perform various operations, including the instructions of one or more software applications (including an application providing a speed feedback unit 44, discussed further below). The memory 32 may also store the data that is generated and/or used by such applications.

The user interface 34 includes hardware, firmware and/or software configured to enable a user to interact with (i.e., provide inputs to and/or perceive outputs of) the computing device or system 14. For example, the user interface 34 may include a display for providing visual outputs, such as an LCD, LED, OLED or other suitable type of display. Alternatively, or in addition, the user interface 34 may include one or more speakers for providing audio outputs. In some implementations, the user interface 34 also includes one or more input components (e.g., a keyboard, microphone, etc.), which may or may not be integrated with an output component (e.g., as a touchscreen).

The satellite positioning unit 40 includes hardware, firmware and/or software configured to provide self-positioning/locating capabilities based on detected satellite signals. For example, the satellite positioning unit 40 may utilize Global Positioning System (GPS) technology, or any other suitable type of Global Navigation Satellite System (GNSS) technology. In other implementations, unit 40 may instead employ a non-satellite-based positioning technology (e.g., positioning based on WiFi access point signals and known locations of the access points). In the discussion that follows, it is understood that any locations determined by the satellite positioning unit 40 may instead be determined by any other suitable positioning technology.

The V2I communication interface 42 includes hardware, firmware and/or software configured to enable computing device or system 14 to wirelessly receive (and possibly also send) electronic data from (to) other objects, devices, systems, etc., via a V2I communication protocol. The V2I communication protocol may be a Dedicated Short Range Communication (DSRC) protocol, a WiFi protocol (e.g., IEEE 802.11ac, etc.), or any other suitable communication protocol.

The traffic light 16, which may include structural hardware (e.g., a post, or a mounting unit for coupling to a cable, etc.) and/or other components not shown in FIG. 1, is positioned so as to be visible to traffic approaching from at least one direction, and may be positioned at the intersection of two or more roads (e.g., over the road, or at a corner of the intersection, etc.). Alternatively, the traffic light 16 may be positioned at the intersection of a road and another type of thoroughfare (e.g., a pedestrian crossing, a cycling path, train tracks, etc.).

The processing component 18 includes a traffic signal control unit 50 that controls the timing of the light signals (e.g., red, yellow and green), and a V2I communication interface 52 that is configured to enable the traffic light 16 to wirelessly transmit (and possibly also receive) electronic data to (from) other objects, devices, systems, etc., via the same V2I communication protocol used by the V2I communication interface 42 (e.g., DSRC, WiFi, etc.). While FIG. 1 depicts the processing component 18 as being affixed to an exterior of the traffic light 16, it is understood that the processing component 18 may instead be contained within the traffic light 16, coupled to the traffic light 16 via a wired or wireless communication link, and so on. In still other implementations, the processing component 18 itself may include two or more physically distinct and/or remote components. For example, the traffic light 16 may contain the traffic signal control unit 50, and the V2I communication interface 52 may instead be contained in a different infrastructure device (e.g., a roadside device dedicated to V2I communications) that is linked to the traffic light 16 via a wired or wireless network.

The traffic signal control unit 50 generates information indicative of the current and/or future status of the traffic light 16 (e.g., the control data itself, or data derived from or reflecting the control data, etc.), and the V2I communication interface 52 transmits the status information to the computing device or system 14 via a V2I communication link 54 using the V2I communication protocol (e.g., DSRC, WiFi, etc.). The status information may specify an amount of time relating to the light status (e.g., if the light is red, the amount of time until the light will turn green), or may provide other information from which such a time can be derived (e.g., the amount of time that the light has been green, if the total duration of a green light is fixed and already known by the computing device or system 14), for example. In various different implementations, the processing component 18 may broadcast the status information for reception by the computing devices or systems of any nearby vehicles, or may multicast or unicast the status information to specific computing devices or systems of nearby vehicles (e.g., upon request).

In operation, the traffic signal control unit 50 causes the color of the traffic light 16 to change between its different states (e.g., green, yellow and red) according to its normal operation (e.g., based purely on predetermined time limits, or based on algorithms/rules that account for factors such as whether a vehicle is currently on a pressure sensor at the intersection, etc.). In some implementations, the traffic signal control unit 50 provides status information to the V2I communication interface 52, and the V2I communication interface 52 broadcasts the status information, on a periodic basis (e.g., once per second, or once every 5 seconds, etc.). In other implementations, the computing device or system 14 requests the status information via the V2I communication link 54 (e.g., by broadcasting a beacon, or by sending a unicast request message to the traffic light 16, etc.), and the traffic signal control unit 50 provides the status information to the V2I communication interface 52 (and the interface 52 transmits the data to the computing device or system 14 via the V2I communication link 54) in response to the request. The computing device or system 14 may request the status information when determining that the vehicle 12 is within some threshold distance of the traffic light 16 (e.g., 1 kilometer, half a kilometer, a quarter kilometer, 200 meters, etc.). Such a determination may be made using locations output by the satellite positioning unit 40, as well as known intersection/traffic light locations, for example.

In either case, the computing device or system 14 receives the status information, via the V2I communication link 54, as the vehicle 12 approaches the intersection equipped with the traffic light 16. Upon receiving the status information, the V2I communication interface 42 may directly or indirectly make the information available to the speed feedback unit 44, or to a larger application that includes the speed feedback unit 44. The speed feedback unit 44 may be a component of a navigation application (as discussed further in connection with FIGS. 2 and 3), for example, or an application dedicated exclusively to providing driver feedback for efficiently moving through intersections.

The speed feedback unit 44 also monitors one or more parameters that are relevant to the amount of time it will take the vehicle 12 to arrive at the intersection associated with the traffic light 16. For example, the speed feedback unit 44 may monitor the current speed of the vehicle 12, and/or the current distance between the vehicle 12 and the intersection.

The speed feedback unit 44 may monitor the current speed in various ways, depending on the implementation. For example, the speed feedback unit 44 may receive current speed data from a vehicle controller (not shown in FIG. 1) that adjusts vehicle speed based on driver input (e.g., depressing the gas pedal, or manually adjusting a cruise control setting). Alternatively, the speed feedback unit 44 may determine the current speed by receiving data from the satellite positioning unit 40. The satellite positioning unit 40 may provide GPS speeds (i.e., speeds calculated by the satellite positioning unit 40 based on measured Doppler shifts), or may provide time-stamped GPS locations that the speed feedback unit 44 may use to calculate speeds, for example. In still other implementations, the speed feedback unit 44 may communicate with a unit that determines speeds using "dead reckoning" techniques. For example, the speed feedback unit 44 may use an inertial measurement unit (IMU) of the computing device or system 14 (not shown in FIG. 1) to calculate current speeds.

The speed feedback unit 44 may also, or instead, monitor the current distance to the intersection in various ways, depending on the implementation. For example, the speed feedback unit 44 may determine the location of the intersection (i.e., the location of the traffic light 16 itself, or another location that is on, or in the close vicinity of, the intersection) based on data that is received (along with the traffic light status information) from the traffic light 16 via the V2I communication link 54. Alternatively, the speed feedback unit 44 may determine the intersection location based on map data that is stored locally (e.g., in the memory 32) or downloaded from a remote map server (e.g., via a cellular communication interface of the computing device or system 14, not shown in FIG. 1). The speed feedback unit 44 may also determine the location of the vehicle 12 (or more precisely, the location of the computing device or system 14)

by receiving location data from the satellite positioning unit 40, and calculate the distance to the intersection using the determined locations of the intersection and the vehicle 12.

The speed feedback unit 44 may use the traffic light status information and one or more of the monitored parameter(s) to determine in real time a "suggested" speed that, if continuously followed/matched by the driver, would cause the vehicle 12 to arrive at the intersection while the traffic light 16 is green, or otherwise avoid stopping (in a legal manner) as the vehicle 12 moves through the intersection. The speed feedback unit 44 may determine the suggested speed using an appropriate algorithm or equation(s). If the status information indicates that the traffic light 16 is currently red but will turn green in 31 seconds, and that the vehicle 12 is approximately 230 meters from the intersection, for example, the speed feedback unit 44 may determine a suggested speed of 26.7 kilometers per hour, using the equation (0.230 km/31 sec)*(3600 sec/hour)=26.7 km/hour. Alternatively, the speed feedback unit 44 may determine a slightly lower suggested speed (e.g., 5% lower, 2% lower, etc.), in order to avoid the vehicle 12 arriving at the intersection precisely when the traffic light 16 turns green. As a result, the driver need not accept "on faith" that the light will turn green the instant the vehicle 12 enters the intersection. Other algorithms may be used as well, such as more complex algorithms that account for traffic patterns ahead (e.g., as learned based on cellular communications between the computing device or system 14 and a server, and/or based on Vehicle-to-Vehicle (V2V) data received from nearby vehicles, etc.).

The speed feedback unit 44 may determine/update the suggested speed on a periodic or other recurring basis as the vehicle 12 draws nearer to the intersection. For example, the suggested speed may increase if the driver has been driving slower than the suggested speed up until that time, or decrease if the driver has been driving faster than the suggested speed. Moreover, the speed feedback unit 44 may update the suggested speed if the status information from the traffic light 16 indicates an abrupt change in timing. For example, the traffic light 16 may initially send the computing device or system 14 data indicating that the currently-red traffic light 16 will turn green in 95 seconds, but a few seconds later (e.g., after first other vehicle has pulled onto a pressure sensor at the intersection) send data indicating that the traffic light 16 will turn green in only 20 seconds.

The speed feedback unit 44 may also calculate (in real time) a difference between the suggested speed and the monitored current speed of the vehicle 12, and cause the user interface 34 to present a dynamic indicator of that difference to the driver. For example, a display of the user interface 34 may contain text characters instructing the driver to increase or decrease speed (e.g., "+4 km/hr," or more generally "go faster to avoid red light," etc.), and/or the display may turn a different shade or color, etc., to indicate that the driver should increase his or her speed. Alternatively, or in addition, a speaker of the user interface 34 may emit messages such as "increase speed by 5 km/hr," or "go faster to avoid red light," etc. In other implementations, the speed feedback unit 44 causes the user interface 34 to present a dynamic visual or audio indicator of the suggested speed itself, without monitoring the current speed or calculating a difference between current speed and suggested speed. Some examples of visual dynamic indicators representing a difference between the suggested and current speed are discussed below in connection with FIGS. 4 and 5.

In an alternative implementation, traffic light status information is not received via a V2I communication link, and is instead received from another source. For example, the computing device or system 14 may receive the status information from a municipal server or other computing system that centrally manages and/or tracks traffic light status (e.g., via a cellular or other long-range communication network). In such an implementation, the communication interface 42 may instead be a cellular communication network utilizing a cellular communication protocol (e.g., a 4G or 5G protocol), for example. As another example, the computing device or system 14 may receive the status information from one or more other vehicles that are closer to the traffic light 16. The other vehicle(s) may determine traffic light status by processing locally-generated camera images, for example, and transmit the status to the computing device or system 14 directly or indirectly via a V2V or longer-range communication link(s).

In some implementations, the speed feedback unit 44 determines suggested speed based not only on the status of (and distance to) the traffic light 16, but also on the status of (and distance to) one or more other traffic lights along an expected route of the vehicle 12. For example, the speed feedback unit 44 may determine a speed that, if matched by the driver of the vehicle 12, will cause the vehicle 12 to "hit" as many green lights as possible within a set of eight traffic lights along the driver's planned route (e.g., as determined based on a navigation request entered by the driver and a routing engine of a remote server).

Figure 2:
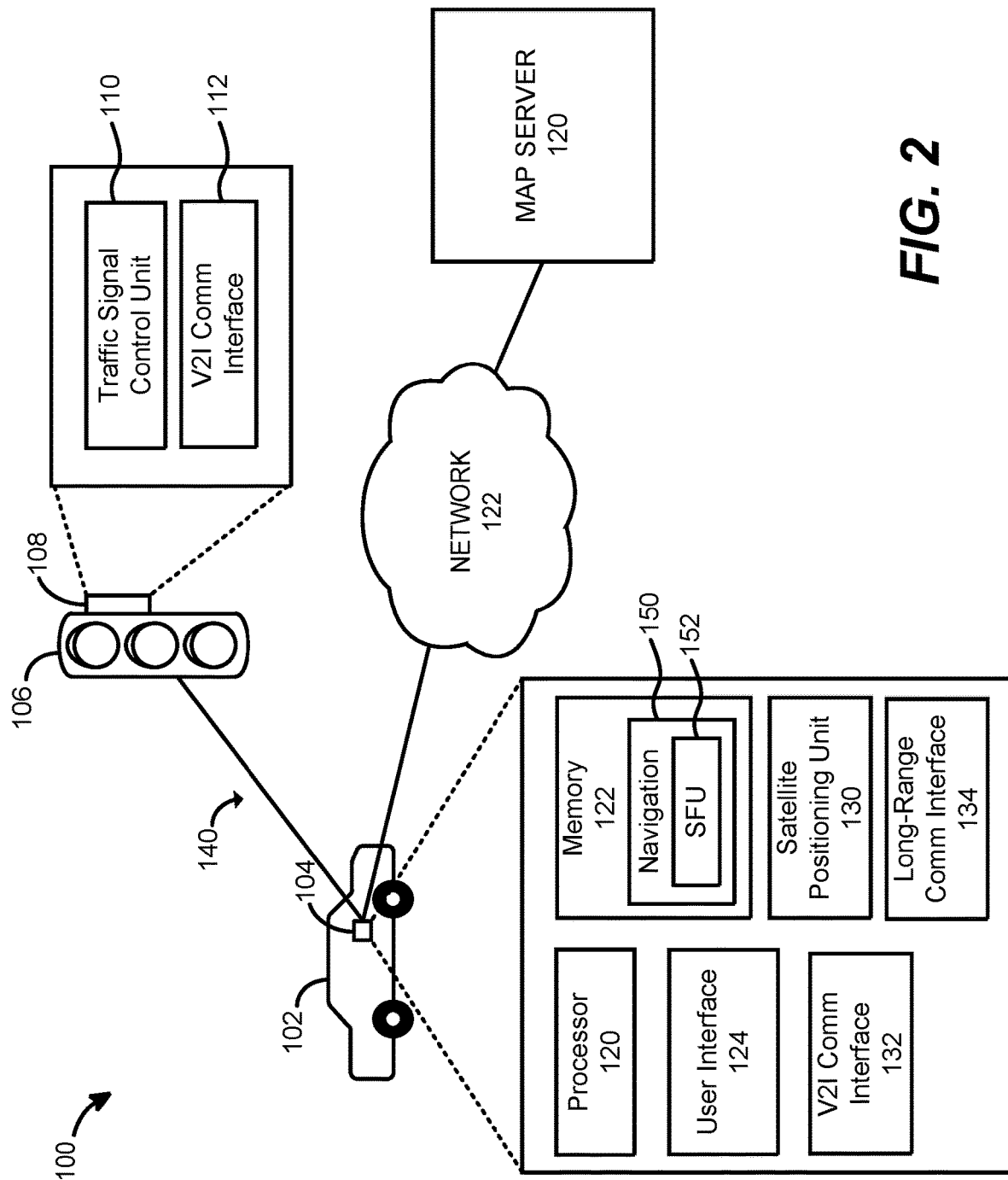
FIG. 2 is a block diagram corresponding to a first particular implementation of the example system of FIG. 1, in which driver feedback is provided via a navigation application.

FIG. 2 illustrates another example system 100, depicting a particular implementation of the system 10 in which the speed feedback unit 44 of FIG. 1 is incorporated within a navigation application. As seen in FIG. 2, the example system 100 includes a vehicle 102 carrying a computing device or system 104, and a traffic light 106 having a processing component 108. The vehicle 102, computing device or system 104, traffic light 106, and processing component 108 may be the same as (or similar to) the vehicle 12, computing device or system 14, traffic light 16, and processing component 18, respectively, of FIG. 1. Moreover, the processing component 108 includes a traffic signal control unit 110 and a V2I communication interface 112, which may be the same as (or similar to) the traffic signal control unit 50 and a V2I communication interface 52, respectively, of FIG. 1.

The system 100 also includes a map server 120, which generally provides mapping-related (e.g., routing and navigation) data and services, and is configured to communicate with the computing device or system 104 via a network 122. The network 122 may include any suitable wired and/or wireless communication network or networks, such as one or more local area networks (LANs), metropolitan area networks (MANs), and/or wide area network (WANs). As just one specific example, the network 122 may include a cellular network, the Internet, and a server-side LAN. The map server 120 may be remote from the vehicle 102, and may be associated with (e.g., owned and/or maintained by) a mapping/navigation service provider. While referred to herein as a "server," the map server 120 may, in some implementations, include multiple co-located or remotely distributed computing devices or systems. It is understood that the map server 120 may be in communication with numerous computing devices and/or systems (not shown in FIG. 2) of different users.

The computing device or system 104 includes a processor 120, a memory 122, a user interface 124, a satellite positioning unit 130, and a V2I communication interface 132, which may be the same as (or similar to) the processor 30, memory 32, user interface 34, satellite positioning unit 40, and V2I communication interface 42, respectively, of FIG. 1. The computing device or system 104 also includes a long-range communication interface 134, which includes hardware, firmware and/or software configured to enable computing device or system 104 to wirelessly exchange electronic data with the map server 120 via the network 122.

In the example implementation of FIG. 2, the memory 122 stores at least a navigation application 150. The navigation application 150 is executable by the processor 120 to cause the user interface 124 to provide the user (e.g., driver) with a graphical user interface (GUI) presented on a display of the user interface 124, where the GUI enables the user to access the services provided by the map server 120.

In operation, a user of the computing device and system 104 (e.g., the driver) causes the computing device and system 104 to launch the navigation application 150, and requests navigation instructions at least by specifying a desired destination via the user interface 124 (e.g., by entering a destination address, selecting a saved destination, or selecting a "directions" link on a website associated with the destination, etc.). The navigation application 150 may then cause a corresponding navigation request to be transmitted to the map server 120 via the long-range communication interface 134 and the network 122. The navigation application 150 may also communicate with the satellite positioning unit 130 to obtain a current location of the user, and include the current location in the navigation request.

The map server 120 may receive the request, and determine at least one route from the user's current location to the destination. Once the route is determined (and, in some implementations, selected or confirmed by the user), the map server 120 may transmit route information and navigation instructions via the network 122, to assist the driver in traveling to the destination. The navigation application 150 may cause a display of the user interface 124 to present a map showing the determined route, and/or an ordered list of turn-by-turn instructions from the current user location to the destination, for example. The navigation application 150 may continue to communicate with the satellite positioning unit 130 as the vehicle 102 moves, in order to determine changes to the current location of the user while navigating, and may continue to communicate with the map server 120 to update the map and/or the depicted route as needed.

The speed feedback unit 152 of the navigation application 150 may also make use of the route information received from the map server 120. In particular, in some implementations, the route information from the map server 120 includes an indication of which intersections along the route are equipped with traffic lights, and the speed feedback unit 152 may use that information, in conjunction with the current location of the vehicle 102, to identify approaching traffic lights along the route, and/or to calculate distances to those traffic lights. Moreover, in some implementations, the status information from each traffic light (e.g., traffic light 106) may include an identifier that is indicative of the intersection at which the traffic light is positioned. In implementations where the traffic light 106 (and possibly other traffic lights) broadcast traffic light status information, the speed feedback unit 152 may use these identifiers to ignore any status information arriving from traffic lights that are not positioned along the route. In implementations where the traffic light 106 (and possibly other traffic lights) provide traffic light status information in response to a request, the speed feedback unit 152 may include the identifiers within its requests, in order to direct the requests to the appropriate traffic lights.

In other respects, the system 100 may operate in any of the ways discussed above in connection with FIG. 1. For example, the speed feedback unit 152 may also monitor current speed of the vehicle 102 and/or the current distance between the vehicle 102 and the intersection, and the speed feedback unit 152 may use the traffic light status information and one or more of the monitored parameter(s) to determine and update as needed a "suggested" speed that, if continuously followed/matched by the driver, would cause the vehicle 102 to arrive at the intersection while the traffic light 106 is green, or otherwise avoid stopping (in a legal manner) as the vehicle 102 moves through the intersection. As was also discussed above, the speed feedback unit 152 may calculate (in real time) a difference between the suggested speed and the monitored current speed of the vehicle 102, and cause the user interface 124 to present a dynamic visual and/or audio indicator of that difference (or, in other implementations, the suggested speed itself) to the driver.

Figure 3:
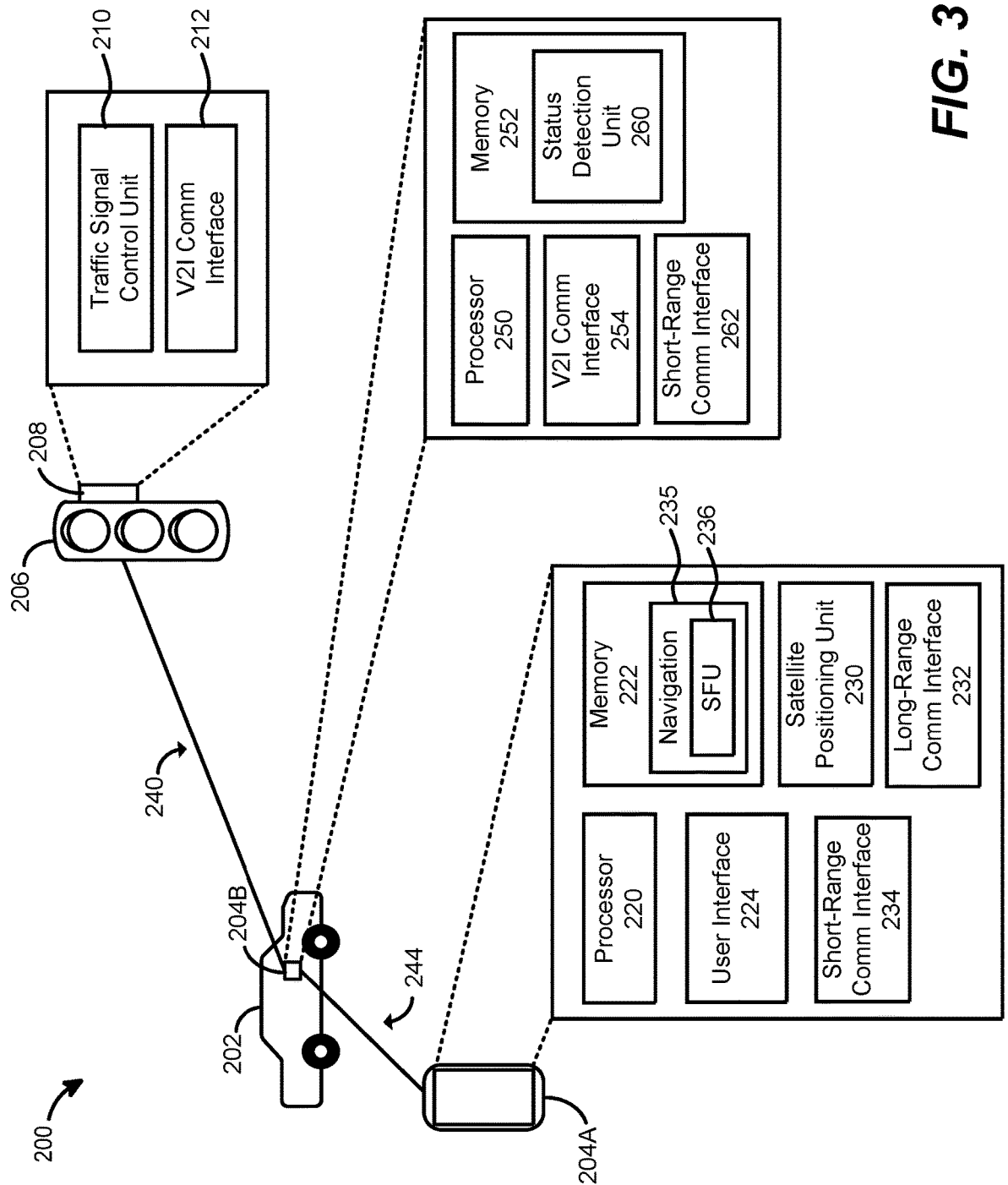
FIG. 3 is a block diagram corresponding to a second particular implementation of the example system of FIG. 1, in which driver feedback is provided via a navigation application executed on a mobile computing device, and also via an intermediary, integrated vehicle component.

FIG. 3 illustrates another example system 200, depicting a particular implementation of the system 10 in which the speed feedback unit 44 of FIG. 1 is incorporated within a navigation application executed by a mobile computing device, and in which the mobile computing device communicates with approaching traffic lights via an onboard computing system of a vehicle. As seen in FIG. 3, the example system 200 includes a vehicle 202 carrying a mobile computing device 204A (e.g., of a driver of the vehicle 202), an onboard computing system 204B, and a traffic light 206 having a processing component 208. The vehicle 202, traffic light 206, and processing component 208 may be the same as (or similar to) the vehicle 12, traffic light 16, and processing component 18, respectively, of FIG. 1. Moreover, the processing component 208 includes a traffic signal control unit 210 and a V2I communication interface 212, which may be the same as (or similar to) the traffic signal control unit 50 and a V2I communication interface 52, respectively, of FIG. 1. While not shown in FIG. 3, the system 200 may also include a map server and network similar to the map server 120 and network 122, respectively, of FIG. 2.

The mobile computing device 204A may be a smartphone, a wearable computing device (e.g., smart glasses or a smart watch), a tablet, or any other mobile (e.g., personal) computing device associated with the driver or a passenger, and the onboard computing system 204B may be affixed to (e.g., integrated within) the vehicle 202. The mobile computing device 204A includes a processor 220, a memory 222, a user interface 224, and a satellite positioning unit 230, which may be the same as (or similar to) the processor 30, memory 32, user interface 34, and satellite positioning unit 40, respectively, of FIG. 1. The mobile computing device 204A also includes a long-range communication interface 232, which may be the same as (or similar to) the long-range communication interface 134 of FIG. 2 (to enable the exchange of data with a map server similar to the map server 120), and a short-range communication interface 234. The short-range communication interface 234 includes hardware, firmware and/or software configured to enable the mobile computing device 204A to exchange electronic data with the onboard computing system 204B via a wired or wireless short-range communication link 244. For example, the short-range communication interface 234 may communicate using a Bluetooth, WiFi, or Universal Serial Bus (USB) protocol.

In the example implementation of FIG. 3, the memory 222 stores at least a navigation application 235 having a speed feedback unit 236. The navigation application 235 and speed feedback unit 236 may be similar to the navigation application 150 and speed feedback unit 152 of FIG. 2, for example. In this implementation, however, the navigation application 235 does not communicate directly with the traffic light 206, and instead communicates with the traffic light 206 via the onboard computing system 204B as described further below.

The onboard computing system 204B includes a processor 250, a memory 252, and a V2I communication interface 254, which may be the same as (or similar to) the processor 30, memory 32, and V2I communication interface 42, respectively, of FIG. 1. The memory stores the instructions of a status detection unit 260, which may provide some of the functionality of the speed feedback unit 44 discussed above in connection with FIG. 1. In particular, the status detection unit 260 may be configured to receive traffic light status information that is sent (e.g., broadcast) from traffic lights, as discussed further below. The onboard computing system 204B also includes a short-range communication interface 262, which includes hardware, firmware and/or software configured to enable the onboard computing system 204B to wirelessly exchange electronic data with the mobile computing device 204A via the short-range communication link 244. The short-range communication interface 262 may be similar to the short-range communication interface 234, for example.

In operation, a user of the mobile computing device 204A (e.g., the driver) causes the mobile computing device 204A to launch the navigation application 235, and requests navigation instructions at least by specifying a desired destination via the user interface 224 (e.g., as discussed above in connection with FIG. 2). The navigation application 235 may then cause a corresponding navigation request to be transmitted to a map server via the long-range communication interface 232 and a network (e.g., similar to the network 122 of FIG. 2). The mobile computing device 204A may then receive route information and navigation instructions from the map server, and the navigation application 235 may cause a display of the user interface 224 to present a map showing the route, and/or an ordered list of turn-by-turn instructions, for example.

As the vehicle 202 approaches the traffic light 206, the onboard computing system 204B receives the traffic light status (e.g., time remaining until a current red light turns green) via a V2I communication link 240 and the V2I communication interface 254. In various different implementations, the traffic light 206 may broadcast, multicast, or unicast the status information, on a periodic basis or in response to one or more requests from the onboard computing system 204B. The status detection unit 260 causes the short-range communication interface 262 to transmit the status information to the mobile computing device 204A (via the short-range communication link 244) as that status information, and possibly status updates, is/are received. The status information may be forwarded or "pushed" to the mobile computing device 204A periodically, or may be sent in response to requests generated by the speed feedback unit 236 of the mobile computing device 204A, for example.

The speed feedback unit 326 may also monitor one or more parameters that are relevant to the amount of time it will take the vehicle 202 to arrive at the intersection associated with the traffic light 206. For example, the speed feedback unit 236 may monitor the current speed of the vehicle 202, and/or the current distance between the vehicle 202 and the intersection, as discussed above in connection with FIG. 1. In the implementation of FIG. 3, however, the speed feedback unit 236 may cause the mobile computing device 204A to obtain one, some or all of the parameters via the onboard computing system 204B.

For example, the speed feedback unit 236 may receive current speed data from the onboard computing system 204B, with the onboard computing system 204B accessing the speed data via a Controller Area Network (CAN), an on-board diagnostics (OBD) system, or another suitable means. As another example, the speed feedback unit 236 may determine the current distance to the intersection using a distance obtained from the onboard computing system 204B. For instance, the vehicle 202 may be equipped with a forward-facing camera, and the onboard computing system 204B may process images from the camera to estimate distances to approaching traffic lights.

Alternatively, or in addition, the speed feedback unit 236 may determine one, some or all of the monitored parameters locally, and/or using data from sources other than the onboard computing system 204B. For example, the speed feedback unit 236 may use the satellite positioning unit 230 or an IMU of the mobile computing device 204A, and possibly intersection location data from the traffic light 206 or another infrastructure component (or a remote server, etc.), in order to determine current speed and/or the current distance to an approaching intersection (e.g., as discussed above in connection with FIG. 1).

In other respects, the system 200 may operate in the manner discussed above in connection with FIG. 1. For example, the speed feedback unit 236 may use the traffic light status information and one or more of the monitored parameter(s) to determine and update as needed a "suggested" speed that, if continuously followed/matched by the driver, would cause the vehicle 202 to arrive at the intersection while the traffic light 206 is green, or otherwise avoid stopping (in a legal manner) as the vehicle 202 moves through the intersection. Also as discussed above, the speed feedback unit 236 may calculate (in real time) a difference between the suggested speed and the monitored current speed of the vehicle 202, and cause the user interface 224 to present a dynamic visual and/or audio indicator of that difference (or, in other implementations, the suggested speed itself) to the driver.

It is understood that the other variations discussed above in connection with FIG. 1 (e.g., determining a suggested speed based on status of two or more approaching traffic lights, and/or obtaining traffic light status information from one or more sources other than infrastructure) may be applied to the system 100 of FIG. 2 or the system 200 of FIG. 3. Moreover, it is understood that other variations/implementations not expressly described above will also be apparent to one of ordinary skill in the art, and are within the scope of the present invention.

Example GUIs

Figure 4:
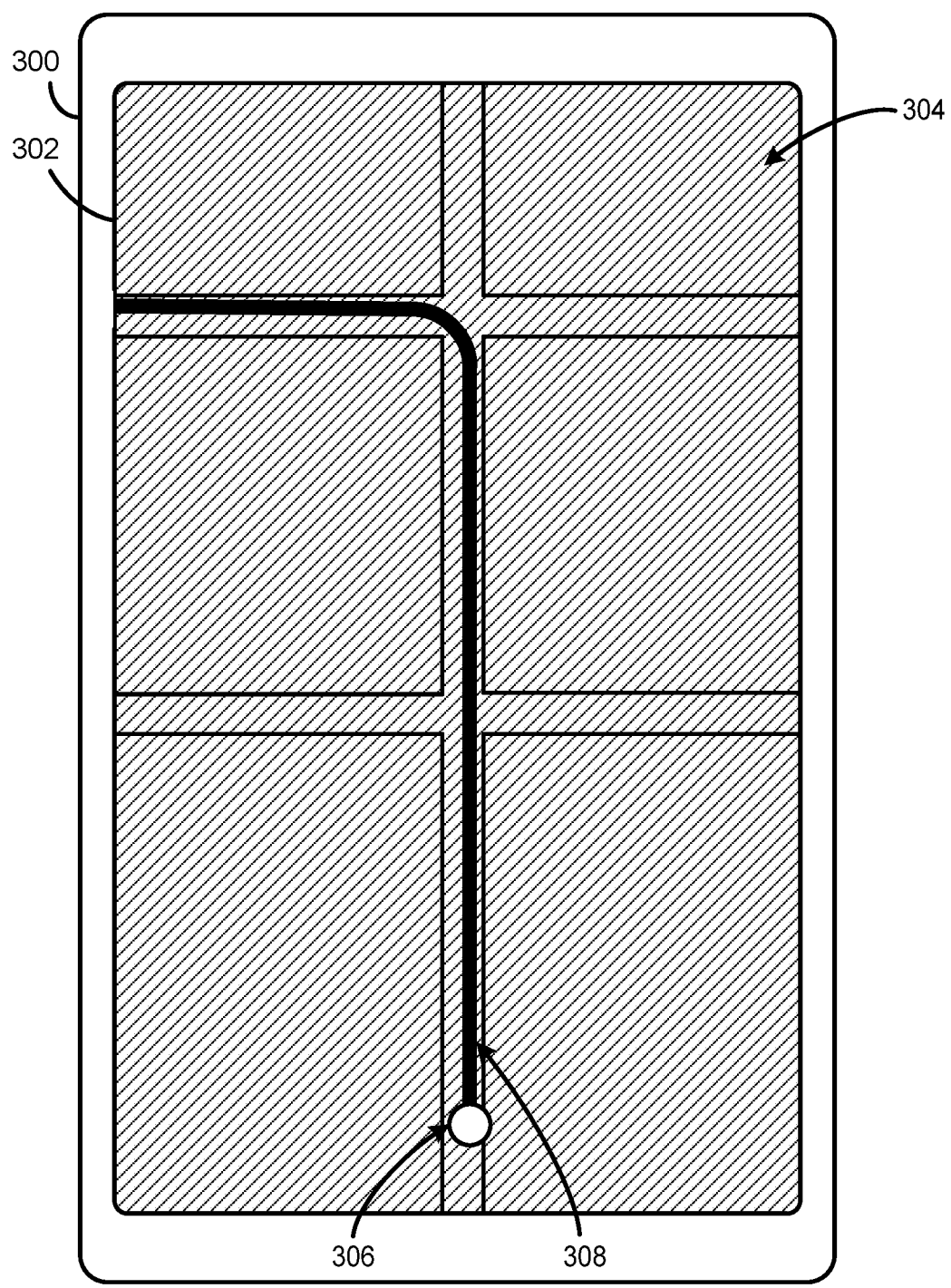
FIG. 4 depicts an example mobile computing device, in one implementation and scenario where a navigation-based graphical user interface of the device provides driver feedback for efficiently traversing intersections.

FIG. 4 depicts an example mobile computing device 300, in one implementation and scenario where a display 302 of the device 300 provides a navigation-based GUI containing driver feedback for efficiently traversing intersections. While FIG. 4 shows the mobile computing device 300 having the form factor of a smartphone, the mobile computing device 300 may instead be a wearable computing device (e.g., a smart watch with a circular or rectangular display, or smart glasses, etc.), a tablet, or any other suitable type of mobile computing device having a display. In some implementations, the mobile computing device 300 is the mobile computing device 204A of FIG. 3, at least a portion of the computing device or system 10 of FIG. 1, or at least a portion of the computing device or system 100 of FIG. 2.

The display 302 may be at least a portion of user interface 34 of FIG. 1, user interface 124 of FIG. 2, or user interface 224 of FIG. 3, for example. For instance, the display 302 may be an LCD, LED, or OLED display, and may or may not be a touchscreen configured to accept user inputs (e.g., to detect touch locations and/or gestures).

FIG. 4 depicts a scenario in which a navigation application (e.g., the navigation application 150 of FIG. 2 or the navigation application 235 of FIG. 3) is executing on the mobile computing device 300, and depicting a map 304 overlaid with a current location indicator 306 and a route 308. The current location indicator 306 may correspond to the current location of the driver's vehicle (or more precisely, the location of the mobile computing device 300, as determined by the satellite positioning unit 130 of FIG. 2 or the satellite positioning unit 230 of FIG. 3, for example). The route 308 may correspond to a navigation request (e.g., current location and destination), and the map 304 may include a digital representation of the real-world geographic area that includes and surrounds the route 308.

As discussed above in connection with FIGS. 1 through 3, a speed feedback unit of the navigation application (e.g., speed feedback unit 44 of FIG. 1, speed feedback unit 152 of FIG. 2, or speed feedback unit 236 of FIG. 3) may generate/set/update a dynamic, visual indicator that indicates whether the driver should increase or decrease the speed of the vehicle. In the implementation of FIG. 4, for example, the dynamic visual indicator may be a variable color or hue (and/or shading, brightness, etc.) of the entire map 304, as indicated by the shading (diagonal, parallel lines) shown in FIG. 4, but with a transparency level that permits the user to easily view the details of the map 304 and route 308 across the entire color range. For instance, the map 304 may be colored in a spectrum range that extends from red to yellow to green, with the current color being mapped to the current difference between the vehicle's current speed (as monitored by the speed feedback unit) and the suggested speed (as calculated/determined by the speed feedback unit).

As a more specific example, the map 304 may be colored red when the suggested speed is at least 10 kilometers per hour slower than the current vehicle speed, colored green when the suggested speed is at least 10 kilometers per hour faster than the current vehicle speed, and set to a color between red and green when the speed difference is between −10 and +10 kilometers per hour. The color may be varied in a substantially continuous manner, or may have a relatively small number of discrete color settings (e.g., in addition to the above thresholds, being orange when the suggested speed is between 3.5 and 10 kilometers per hour slower than the current vehicle speed, yellow when the suggested speed is between 3.5 kilometers per hour slower and 3.5 kilometers faster than the current vehicle speed, and yellow-green when the suggested speed is between 3.5 and 10 kilometers per hour faster than the current vehicle speed).

In other implementations, the dynamic visual indicator is located on only a specific portion of the display 302. For example, the color of only the route 308 (and/or an outline of the route 308) may be adjusted, or the color of only an outer border of the entire map 304 (not depicted in FIG. 4) may be adjusted, etc.

Figure 5:
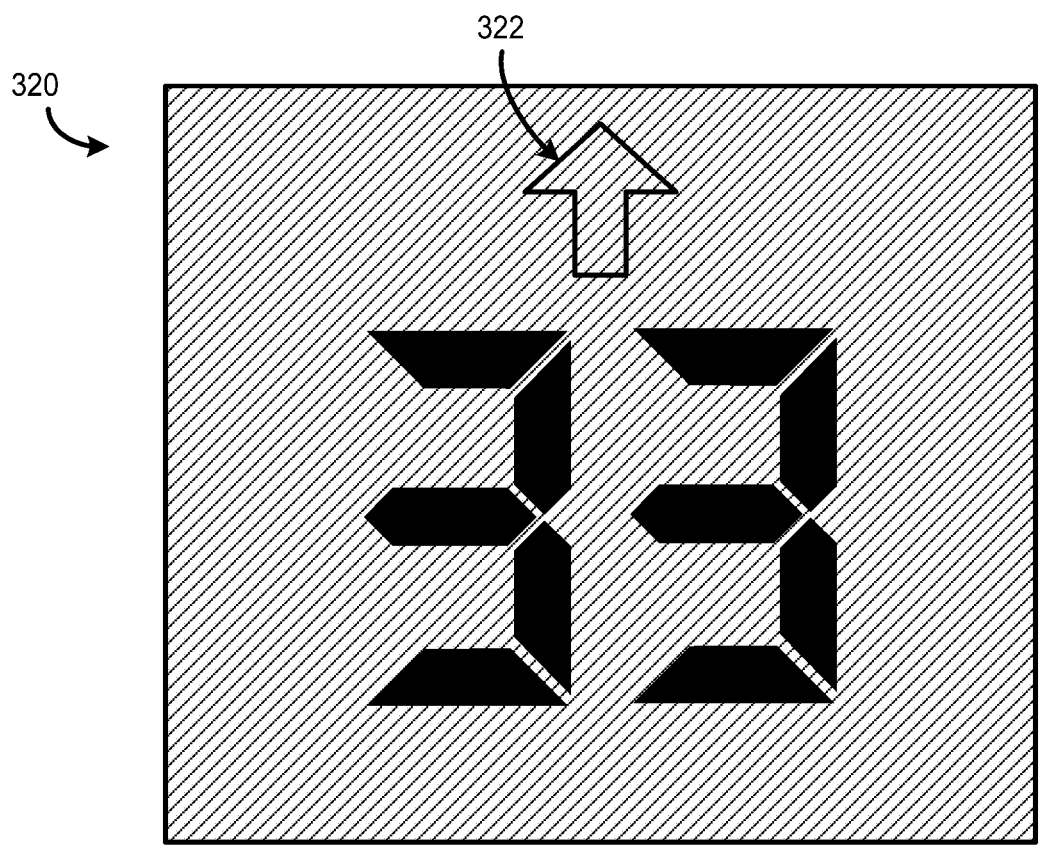
FIG. 5 depicts an example integrated vehicle display, in one implementation and scenario where the display provides driver feedback for efficiently traversing intersections.

FIG. 5 depicts another display 320, which may be at least a portion of a display integrated within a dashboard of a vehicle, for example. The display 320 may be a part of the user interface 34 of FIG. 1 or the user interface 124 of FIG. 2, for example, in an implementation where the computing device or system 14 or the computing device or system 104, respectively, is an onboard computer of the vehicle 12 or the vehicle 102, respectively. The display 320 may be an LCD, LED, or OLED display, for example, and may or may not be a touchscreen configured to accept user inputs (e.g., to detect touch locations and/or gestures).

FIG. 5 depicts a scenario in which the vehicle is currently moving at 33 kilometers (or miles) per hour, and in which a speed feedback unit (e.g., speed feedback unit 44 of FIG. 1 or speed feedback unit 152 of FIG. 2) has determined that the driver should increase his or her speed in order to reduce traffic light delay (e.g., to arrive at the next intersection while the traffic light is green). Accordingly, in this implementation, a dynamic visual indicator 322 depicts an upward-pointing arrow. If and when the speed feedback unit determines that the driver should decrease speed, the indicator 322 may be changed to a downward-pointing arrow. In some implementations, the indicator 322 may have a different, third appearance (e.g., a check mark, or a green circle, etc.) if and when the speed feedback unit determines that the driver current speed is within some threshold amount of the suggested speed (e.g., plus or minus 2 kilometers per hour, or plus or minus 5% of the suggested or current speed, etc.), and/or the arrow of the indicator 322 may also be color- and/or brightness-coded to indicate the magnitude of the difference between the suggested and current speeds.

In some implementations, the shaded area of the display 320 (as indicated by diagonal, parallel lines in FIG. 5) may also be color coded as discussed above, either with or without the indicator 322. For example, the dynamic visual indicator may be a transparent color overlay or background, rather than (or in addition to) an arrow or other graphic.

Example Method for Efficiently Guiding a Driver of a Vehicle Through Intersections An example method 350 for efficiently guiding a driver of a vehicle through one or more intersections using driver feedback is discussed next, with reference to FIG. 6. The method 350 is implemented by a computing device or system associated with the driver or the vehicle (e.g., the computing device or system 14 of FIG. 1, the computing device or system 104 of FIG. 2, or a combination of the mobile computing device 204A and the onboard computing system 204B of FIG. 3). For example, the method 350 may be implemented by one or more processors of the computing device or system when executing instructions of an application stored on a computer-readable medium (e.g., instructions of the speed feedback unit 44 of FIG. 1, the navigation application 150 of FIG. 2, or the navigation application 235 of FIG. 3). It is understood that the computing device or system may be "associated with" (as that term is used herein) the vehicle by virtue of being carried within the vehicle, and "associated with" the driver by virtue of being used by the driver (even if the driver does not own the device or system). Thus, for example, a smartphone or other mobile computing device owned, carried, etc., by a non-driving passenger in the vehicle may be associated with the vehicle and/or driver.

At block 352, information regarding the status of one or more traffic lights (positioned at one or more intersections that the vehicle is approaching) is received. The information may be received via a V2I communication link (e.g., directly from the traffic light(s)), from a central server remote from the vehicle, or from another source or link (e.g., another vehicle using V2V communication, a smartphone of another driver using WiFi, etc.). The information may be received from any of the sources described in FIG. 1, 2 or 3, and using any of the communication protocols described in FIG. 1, 2 or 3, for example.

At block 354, the current speed of the vehicle is monitored, over time, as the vehicle approaches the one or more intersections. The speed may be monitored as described above in connection with FIG. 1, 2 or 3, for example. In some implementations and/or scenarios, blocks 352 and 354 occur at least partially in parallel (e.g., if the traffic light status information is updated over time, with updates being received periodically or on some other recurring basis). In other implementations and/or scenarios, block 354 occurs strictly after block 352.

At block 356, a dynamic visual or audio indicator is caused to be presented to the driver via a display or speaker, respectively, of the computing device or system implementing the method 350. The dynamic indicator is indicative of one or more changes in speed that, if matched by the driver as the vehicle approaches the one or more intersections, would cause the driver to avoid one or more stops as the vehicle moves through the intersection(s) (e.g., by causing the vehicle to encounter as few red lights as possible among the intersections). Block 356 may include setting the dynamic indicator based on both the information regarding traffic light status, and the current speed. Thus, block 356 may occur at least partially in parallel with block 354, and also (e.g., if the traffic light status information is updated over time) with block 352.

The dynamic indicator may be a color, shade, brightness, and/or other visual characteristic of a display (or display portion) that is automatically adjusted to indicate the change(s) in speed. Alternatively, or in addition, the dynamic indicator may include a graphic, icon, text, and/or one or more other digital elements. The dynamic indicator may be similar to any of the indicators described above in connection with FIG. 4 or 5, for example, and may be adjusted in any of the ways described above. In implementations were the dynamic indicator is or includes an audio indicator, the indicator may include a spoken message, beeping or other sound effects, and/or one or more other audio elements that instruct the driver to drive faster or slower in accordance with the change(s) in speed.

Figure 6:
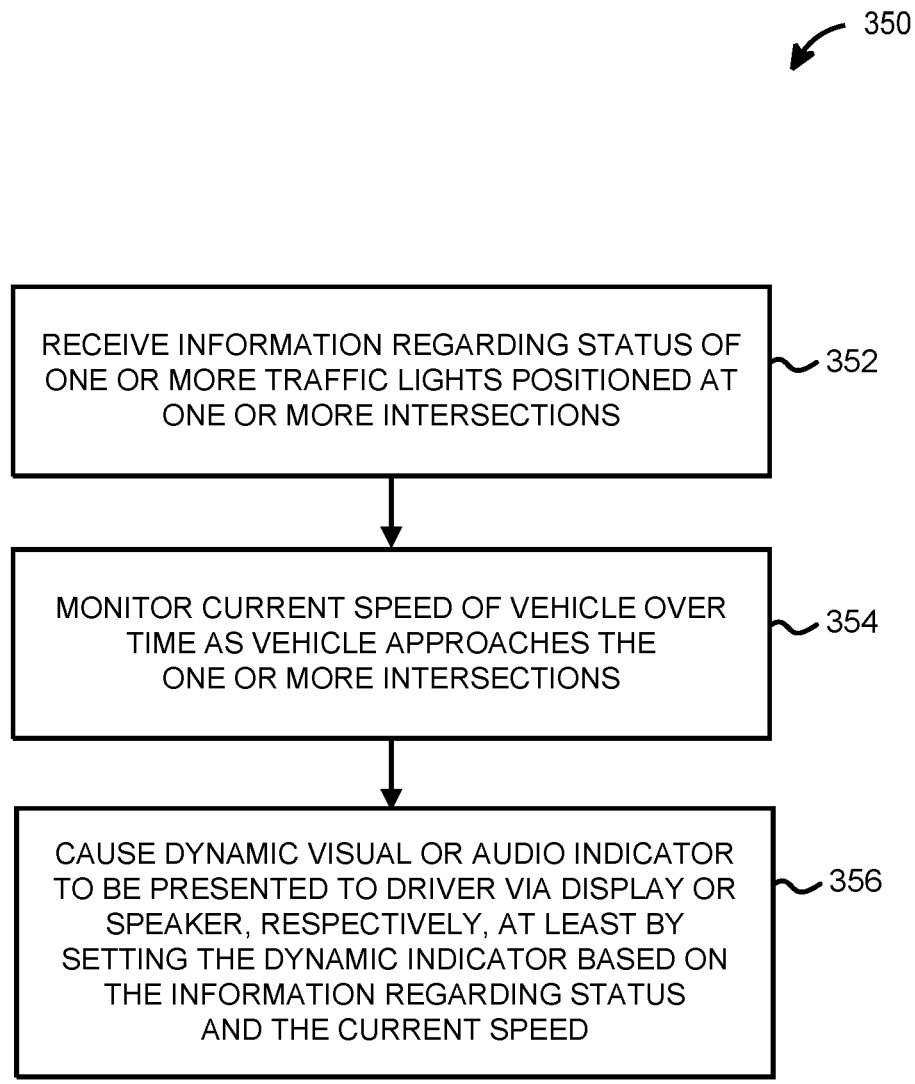
FIG. 6 is a flow diagram of an example method for efficiently traversing intersections using driver feedback.

In some implementations, the method 350 includes one or more additional blocks not shown in FIG. 6. For example, the method 350 may include an additional block in which the current distance between the vehicle and at least one of the one or more intersections is monitored. In such an implementation, the dynamic indicator may be set (at block 356) not only based on the traffic light status information and the current speed, but also based on the current distance. More specifically, the additional block may include monitoring the current position of the vehicle (e.g., using the satellite positioning unit 40 of FIG. 1, the satellite positioning unit 130 of FIG. 2, or the satellite positioning unit 230 of FIG. 3), obtaining a position of the intersection(s) for which distance is being monitored, and determining the current distance based on the current vehicle position and the position of the intersection(s).

As another example, in an implementation where the method 350 is implemented by a mobile computing device (e.g., smartphone), the method 350 may include a first additional block in which the mobile computing device receives data indicative of a route corresponding to a navigation request (e.g., including a destination specified by the driver). The route data may be received from a remote server via a long-range communication link (e.g., from map server 120 of FIG. 2, via network 122). Moreover, in a second additional block, a map depicting at least a portion of that route may be presented to the driver via a display of the mobile computing device. In such an implementation, the dynamic visual indicator may include a dynamic color and/or shade (and/or brightness, etc.) that is presented on the display while the map (with route) is also presented on the display. The dynamic visual indicator may be a background color of the map, for example.

Example Aspects of the Invention

Although the foregoing text sets forth a detailed description of numerous different aspects and embodiments of the invention, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

Aspect 1—A method for efficiently guiding a driver of a vehicle through one or more intersections, the method comprising: receiving, by a computing device or system associated with the driver or the vehicle, information regarding status of one or more traffic lights positioned at the one or more intersections; monitoring, by the computing device or system, a current speed of the vehicle over time as the vehicle approaches the one or more intersections; and causing, by the computing device or system, a dynamic visual or audio indicator to be presented to the driver via a display or speaker, respectively, of the computing device or system, wherein the dynamic indicator is indicative of one or more changes in speed that, if matched by the driver as the vehicle approaches the one or more intersections, would cause the driver to avoid one or more stops as the vehicle moves through the one or more intersections, and wherein causing the dynamic indicator to be presented to the driver includes setting the dynamic indicator based on (i) the information regarding status of the one or more traffic lights and (ii) the current speed.

Aspect 2—The method of aspect 1, further comprising monitoring, by the computing device or system, a current distance between the vehicle and at least one of the one or more intersections, wherein causing the dynamic indicator to be presented to the driver includes setting the dynamic indicator based on (i) the information regarding status of the one or more traffic lights, (ii) the current speed, and (iii) the current distance.

Aspect 3—The method of aspect 2, wherein monitoring the current distance includes: monitoring a current position of the vehicle; obtaining a position of the at least one of the one or more intersections; and determining the current distance based on the current position and the position of the at least one of the one or more intersections.

Aspect 4—The method of aspect 3, wherein monitoring the current position of the vehicle includes monitoring the current position of the vehicle using a satellite positioning component of the computing device or system.

Aspect 5—The method of any one of aspects 1-4, wherein the computing device or system includes a mobile computing device of the driver.

Aspect 6—The method of aspect 5, wherein monitoring the current speed of the vehicle includes monitoring the current speed using a component of the mobile computing device.

Aspect 7—The method of aspect 5, wherein monitoring the current speed of the vehicle includes receiving the current speed from a component of the vehicle via a short-range communication link.

Aspect 8—The method of any one of aspects 5-7, wherein receiving the information regarding status of one or more traffic lights includes receiving the information regarding status of one or more traffic lights at the mobile computing device directly from the one or more traffic lights via a vehicle-to-infrastructure (V2I) communication link.

Aspect 9—The method of any one of aspects 5-7, wherein receiving the information regarding status of one or more traffic lights includes receiving the information regarding status of one or more traffic lights at the mobile computing device from the one or more traffic lights via a component of the vehicle and a short-range communication link.

Aspect 10—The method of any one of aspects 5-9, wherein: the mobile computing device includes the display; and causing the dynamic indicator to be presented to the driver includes causing a dynamic visual indicator to be presented to the driver via the display.

Aspect 11—The method of aspect 10, wherein the dynamic visual indicator includes a dynamic color and/or shade presented on the display, the dynamic color and/or shade automatically adjusting to indicate the one or more changes in speed.

Aspect 12—The method of aspect 11, further comprising: receiving, by the mobile computing device and from a remote server via a long-range communication link, data indicative of a route corresponding to a navigation request; and presenting to the driver, via the display, a map depicting at least a portion of the route, wherein the dynamic visual indicator includes a dynamic color and/or shade presented on the display while the map is also presented on the display.

Aspect 13—The method of any one of aspects 1-4, wherein the computing device or system includes a fixed subsystem of the vehicle.

Aspect 14—The method of aspect 13, wherein receiving the information regarding status of one or more traffic lights includes receiving the information regarding status of one or more traffic lights at the fixed subsystem directly from the one or more traffic lights via a vehicle-to-infrastructure (V2I) communication link.

Aspect 15—The method of aspect 13 or 14, wherein the display is integrated into a dashboard of the vehicle.

Aspect 16—The method of aspect 15, wherein the dynamic visual indicator includes a dynamic color and/or shade presented on the display, the dynamic color and/or shade automatically adjusting to indicate the one or more changes in speed.

Aspect 17—The method of any one of aspects 1-9, 13 or 14, wherein causing the dynamic indicator to be presented to the driver includes causing the speaker to produce audio messages that instruct the driver to drive faster or slower in accordance with the one or more changes in speed.

Aspect 18—The method of any one of aspects 1-7, 9 or 11-16, wherein receiving information regarding status of the one or more traffic lights includes receiving traffic light status information generated by computing devices or systems associated with one or more other drivers or vehicles.

Aspect 19—A computing device or system associated with a vehicle or a driver of the vehicle, the computing device or system comprising: a display or a speaker; a communication interface; one or more processors; and a memory storing instructions that, when executed by the one or more processors, cause the computing device or system to (1) receive, via the communication interface, information regarding status of one or more traffic lights positioned at one or more intersections, (2) monitor a current speed of the vehicle over time as the vehicle approaches the one or more intersections, and (3) cause a dynamic visual or audio indicator to be presented to the driver via the display or the speaker, respectively, of the computing device or system, wherein the dynamic indicator is indicative of one or more changes in speed that, if matched by the driver as the vehicle approaches the one or more intersections, would cause the driver to avoid one or more stops as the vehicle moves through the one or more intersections, and wherein causing the dynamic indicator to be presented to the driver includes setting the dynamic indicator based on (i) the information regarding status of the one or more traffic lights and (ii) the current speed.

Aspect 20—The computing device or system of aspect 19, wherein: the instructions further cause the computing device or system to monitor a current distance between the vehicle and at least one of the one or more intersections; and the instructions cause the computing device or system to set the dynamic indicator based on (i) the information regarding status of the one or more traffic lights, (ii) the current speed, and (iii) the current distance.

Aspect 21—The computing device or system of aspect 20, wherein the instructions cause the computing device or system to monitor the current distance at least by: monitoring a current position of the vehicle; obtaining a position of the at least one of the one or more intersections; and determining the current distance based on the current position and the position of the at least one of the one or more intersections.

Aspect 22—The computing device or system of aspect 21, further comprising a satellite positioning component, and wherein the instructions cause the computing device or system to monitor the current position of the vehicle using the satellite positioning component.

Aspect 23—The computing device or system of any one of aspects 19-22, wherein the instructions cause the computing device or system to receive the information regarding status of the one or more traffic lights directly from the one or more traffic lights via the communication interface and a vehicle-to-infrastructure (V2I) communication link.

Aspect 24—The computing device or system of any one of aspects 19-23, wherein: the dynamic indicator is a dynamic visual indicator; the dynamic visual indicator includes a dynamic color and/or shade presented on the display; and the dynamic color and/or shade automatically adjusts to indicate the one or more changes in speed.

Aspect 25—A mobile computing device associated with a driver of a vehicle, the mobile computing device comprising: a display; a first communication interface; a second communication interface; one or more processors; and a memory storing instructions that, when executed by the one or more processors, cause the mobile computing device to (1) receive, from a remote server via the first communication interface and a long-range communication link, data indicative of a route corresponding to a navigation request, (2) present to the driver, via the display, a map depicting at least a portion of the route, (3) receive, via the second communication interface, information regarding status of one or more traffic lights positioned at one or more intersections, (4) monitor a current speed of the vehicle over time as the vehicle approaches the one or more intersections, and (5)

cause a dynamic visual indicator to be presented to the driver via the display, wherein the dynamic visual indicator includes a dynamic color and/or shade presented on the display while the map is also presented on the display, wherein the dynamic color and/or shade is indicative of one or more changes in speed that, if matched by the driver as the vehicle approaches the one or more intersections, would cause the driver to avoid one or more stops as the vehicle moves through the one or more intersections, and wherein causing the dynamic visual indicator to be presented to the driver includes setting the dynamic color and/or shade based on (i) the information regarding status of the one or more traffic lights and (ii) the current speed.

Aspect 26—The mobile computing device of aspect 25, wherein the first communication interface is a cellular network interface.

Aspect 27—The mobile computing device of aspect 25 or 26, wherein: the second communication interface is a short-range communication interface configured to communicate with a fixed subsystem of the vehicle; and the instructions cause the mobile computing device to receive the information regarding status of one or more traffic lights via a short-range communication link between the mobile computing device and the fixed subsystem.

Aspect 28—The mobile computing device of aspect 25 or 26, wherein: the second communication interface is a vehicle-to-infrastructure (V2I) communication interface configured to communicate with infrastructure components outside the vehicle; and the instructions cause the mobile computing device to receive the information regarding status of one or more traffic lights via a V2I communication link between the mobile computing device and the one or more traffic lights.

Aspect 29—The mobile computing device or system of any one of aspects 25-28, wherein the instructions cause the mobile computing device to monitor the current distance at least by: monitoring a current position of the vehicle; obtaining a position of the at least one of the one or more intersections; and determining the current distance based on the current position and the position of the at least one of the one or more intersections.

Aspect 30—The mobile computing device of aspect 29, further comprising a satellite positioning component, and wherein the instructions cause the mobile computing device to monitor the current position of the vehicle using the satellite positioning component.

Aspect 31—The mobile computing device of any one of aspects 25-30, wherein the dynamic visual indicator includes a dynamic color and/or shade of (i) at least a portion of the map, or (ii) an area surrounding the map on the display.

Other Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Unless specifically stated otherwise, discussions in the present disclosure using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used in the present disclosure any reference to "one implementation" or "an implementation" means that a particular element, feature, structure, or characteristic described in connection with the implementation is included in at least one implementation or embodiment. The appearances of the phrase "in one implementation" in various places in the specification are not necessarily all referring to the same implementation.

As used in the present disclosure, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still other, alternative structural and functional designs for efficiently guiding a driver through intersections using driver feedback, through the principles in the present disclosure. Thus, while particular embodiments and applications have been illustrated and described, it is to be understood that the disclosed embodiments are not limited to the precise construction and components disclosed in the present disclosure. Various modifications, changes and variations, which will be apparent to those skilled in the art, may be made in the arrangement, operation and details of the method and apparatus disclosed in the present disclosure without departing from the spirit and scope defined in the appended claims.

What is claimed is:

1. A method for efficiently guiding a driver of a vehicle through one or more intersections, the method comprising:
receiving, by a computing device or system associated with the driver or the vehicle, information regarding status of one or more traffic lights positioned at the one or more intersections;
monitoring, by the computing device or system, a current speed of the vehicle over time as the vehicle approaches the one or more intersections;
calculating a value of speed for the vehicle that, if matched by the driver, causes the vehicle to arrive at the intersection while the traffic light is green and avoids stopping as the vehicle moves through the intersection; and
causing, by the computing device or system, a dynamic visual or audio indicator to be presented to the driver via a display or speaker, respectively, of the computing device or system, wherein the dynamic indicator is indicative of one or more changes in speed to reach the calculated value of speed, or to reach at least within a threshold value thereof, and wherein causing the dynamic indicator to be presented to the driver includes setting the dynamic indicator based on (i) the information regarding status of the one or more traffic lights and (ii) the current speed.

2. The method of claim 1, further comprising:

monitoring, by the computing device or system, a current distance between the vehicle and at least one of the one or more intersections, wherein causing the dynamic indicator to be presented to the driver includes setting the dynamic indicator based on (i) the information regarding status of the one or more traffic lights, (ii) the current speed, and (iii) the current distance.

3. The method of claim 2, wherein monitoring the current distance includes:

monitoring a current position of the vehicle;

obtaining a position of the at least one of the one or more intersections; and determining the current distance based on the current position and the position of the at least one of the one or more intersections.

4. The method of claim 1, wherein the computing device or system includes a mobile computing device of the driver.

5. The method of claim 4, wherein receiving the information regarding status of one or more traffic lights includes receiving the information regarding status of one or more traffic lights at the mobile computing device directly from the one or more traffic lights via a vehicle-to-infrastructure (V2I) communication link.

6. The method of claim 4, wherein receiving the information regarding status of one or more traffic lights includes receiving the information regarding status of one or more traffic lights at the mobile computing device from the one or more traffic lights via a component of the vehicle and a short-range communication link.

7. The method of claim 1, wherein the computing device or system includes a fixed subsystem of the vehicle.

8. The method of claim 7, wherein receiving the information regarding status of one or more traffic lights includes receiving the information regarding status of one or more traffic lights at the fixed subsystem directly from the one or more traffic lights via a vehicle-to-infrastructure (V2I) communication link.

9. The method of claim 1, wherein causing the dynamic indicator to be presented to the driver includes causing the speaker to produce audio messages that instruct the driver to drive faster or slower in accordance with the one or more changes in speed.

10. The method of claim 1, wherein receiving information regarding status of the one or more traffic lights includes receiving traffic light status information generated by computing devices or systems associated with one or more other drivers or vehicles.

11. A computing device or system associated with a vehicle or a driver of the vehicle, the computing device or system comprising:

a display or a speaker;
a communication interface;
one or more processors; and
a memory storing instructions that, when executed by the one or more processors, cause the computing device or system to receive, via the communication interface, information regarding status of one or more traffic lights positioned at one or more intersections, monitor a current speed of the vehicle over time as the vehicle approaches the one or more intersections, calculate a value of speed for the vehicle that, if matched by the driver, causes the vehicle to arrive at the intersection while the traffic light is green and avoids stopping as the vehicle moves through the intersection, and cause a dynamic visual or audio indicator to be presented to the driver via the display or the speaker, respectively, of the computing device or system, wherein the dynamic indicator is indicative of one or more changes in speed to reach the calculated value of speed, or to reach at least within a threshold value thereof, and wherein causing the dynamic indicator to be presented to the driver includes setting the dynamic indicator based on (i) the information regarding status of the one or more traffic lights and (ii) the current speed.

12. The computing device or system of claim 11, wherein:

the instructions further cause the computing device or system to monitor a current distance between the vehicle and at least one of the one or more intersections; and the instructions cause the computing device or system to set the dynamic indicator based on (i) the information regarding status of the one or more traffic lights, (ii) the current speed, and (iii) the current distance.

13. The computing device or system of claim 12, wherein the instructions cause the computing device or system to monitor the current distance at least by:

monitoring a current position of the vehicle;

obtaining a position of the at least one of the one or more intersections; and determining the current distance based on the current position and the position of the at least one of the one or more intersections.

14. The computing device or system of claim 13, further comprising a satellite positioning component, and wherein the instructions cause the computing device or system to monitor the current position of the vehicle using the satellite positioning component.

15. The computing device or system of claim 11, wherein the instructions cause the computing device or system to receive the information regarding status of the one or more traffic lights directly from the one or more traffic lights via the communication interface and a vehicle-to-infrastructure (V2I) communication link.

16. The computing device or system of claim 11, wherein:

the dynamic indicator is a dynamic visual indicator;

the dynamic visual indicator includes a dynamic color and/or shade presented on the display; and the dynamic color and/or shade automatically adjusts to indicate the one or more changes in speed.

17. A mobile computing device associated with a driver of a vehicle, the mobile computing device comprising:

a display;
a first communication interface;
a second communication interface;
one or more processors; and
a memory storing instructions that, when executed by the one or more processors, cause the mobile computing device to receive, from a remote server via the first communication interface and a long-range communication link, data indicative of a route corresponding to a navigation request, present to the driver, via the display, a map depicting at least a portion of the route, receive, via the second communication interface, information regarding status of one or more traffic lights positioned at one or more intersections, monitor a current speed of the vehicle over time as the vehicle approaches the one or more intersections, calculate a value of speed for the vehicle that, if matched by the driver, causes the vehicle to arrive at the intersection while the traffic light is green and avoids stopping as the vehicle moves through the intersection, and cause a dynamic visual indicator to be presented to the driver via the display, wherein the dynamic visual indicator includes a dynamic color and/or shade presented on the display while the map is also presented on the display, wherein the dynamic color and/or shade is indicative of one or more changes in speed to reach the calculated value of speed, or to reach at least within a threshold value thereof, and wherein causing the dynamic visual indicator to be presented to the driver includes setting the dynamic color and/or shade based on (i) the information regarding status of the one or more traffic lights and (ii) the current speed.

18. The mobile computing device of claim 17, wherein:
the second communication interface is a short-range communication interface configured to communicate with a fixed subsystem of the vehicle; and
the instructions cause the mobile computing device to receive the information regarding status of one or more traffic lights via a short-range communication link between the mobile computing device and the fixed subsystem.

19. The mobile computing device of claim 17, wherein:
the second communication interface is a vehicle-to-infrastructure (V2I) communication interface configured to communicate with infrastructure components outside the vehicle; and
the instructions cause the mobile computing device to receive the information regarding status of one or more traffic lights via a V2I communication link between the mobile computing device and the one or more traffic lights.

20. The mobile computing device or system of claim 17, wherein the instructions cause the mobile computing device to monitor the current distance at least by:
monitoring a current position of the vehicle;
obtaining a position of the at least one of the one or more intersections; and
determining the current distance based on the current position and the position of the at least one of the one or more intersections.

* * * * *